US006964396B2

(12) United States Patent
Williams et al.

(10) Patent No.: US 6,964,396 B2
(45) Date of Patent: Nov. 15, 2005

(54) AUTOMATIC ACCEL VOLTAGE TRACKING SYSTEM FOR AN ION THRUSTER

(75) Inventors: John D. Williams, Colorado Springs, CO (US); Prakash C. Soni, Hawthorne, CA (US); John R. Beattie, Westlake Village, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/011,387

(22) Filed: Dec. 4, 2001

(65) Prior Publication Data

US 2003/0102402 A1 Jun. 5, 2003

(51) Int. Cl.[7] ............................................... F03H 1/00
(52) U.S. Cl. ................. 244/158 R; 244/3.11; 244/3.14; 244/172; 60/200.1; 60/202; 313/359.1; 313/360.1; 313/362.1
(58) Field of Search ............................. 244/3.1, 158 R, 244/3.11, 3.12, 3.13, 3.14, 172; 60/200.1, 202; 313/359.1, 360.1, 361.1, 362, 1, 363.1

(56) References Cited

U.S. PATENT DOCUMENTS

| 3,744,247 | A | * | 7/1973 | Margosian et al. | ...... 313/363.1 |
| 5,369,953 | A | * | 12/1994 | Brophy | ........................ 60/202 |
| 5,448,883 | A | * | 9/1995 | Meserole et al. | ........ 313/360.1 |
| 5,548,953 | A | * | 8/1996 | Hedges et al. | ................. 60/202 |
| 5,689,950 | A | * | 11/1997 | Smith | ....................... 313/360.1 |
| 5,924,277 | A | * | 7/1999 | Beattie et al. | ........... 313/360.1 |

OTHER PUBLICATIONS

J.R. Anderson et al.: "Performance Characteristics of the NSTAR Ion Thruster During an On–Going Duration Ground Test"; "Aerospace Conference Proceedings, 2000 IEEE," vol. 4, pp. 99–122; year 2000.*

* cited by examiner

Primary Examiner—Bernarr E. Gregory
(74) Attorney, Agent, or Firm—John A. Artz; Artz & Artz, P.C.

(57) ABSTRACT

A voltage tracking system for an ion thruster includes a discharge chamber, a screen grid, an accelerator grid, and an accelerator grid voltage controller. The discharge chamber contains plasma at a given potential. The screen grid is adjacent to the discharge chamber and is voltage biased relative to the plasma to form a plasma sheath that repels electrons and attracts ions from the discharge chamber plasma. The accelerator grid is adjacent to the screen grid and has a voltage for accelerating the ions to create thrust and prevent any electrons from backstreaming into the ion thruster from the beam plasma. The accelerator grid voltage controller supplies voltage to the accelerator grid. The accelerator grid voltage controller adjusts the magnitude of the accelerator grid voltage to minimize the amount of voltage required to prevent electron backstreaming into the ion thruster.

22 Claims, 3 Drawing Sheets

AUTOMATIC ACCEL VOLTAGE TRACKING SYSTEM FOR AN ION THRUSTER

TECHNICAL FIELD

The present invention relates generally to ion generation and acceleration systems, and more particularly, to an accelerator voltage tracking system for an ion thruster.

BACKGROUND ART

For some time, ion engines have been used for propulsion of vehicles in space. Ion engines use movement of ions to provide thrust. Outside of space propulsion, ion generation and acceleration may also be applied to various types of materials processing systems involving ion sources, such as ion beam etching or micro-machining.

Generally, an ion thruster utilizes three separate and independent processes to generate thrust; these include ion generation within a discharge chamber, ion acceleration within an ion-optics assembly, and neutralization of the positive ion beam by electrons produced in a neutralizer cathode. An ion engine works by generating plasma ions within a discharge chamber via an electron bombardment process. The ions leave the thruster through the ion-optics assembly consisting of charged screen, accelerator and decelerator grids. The net force from the ions leaving the thruster housing generates a thrust. A neutralizer is located outside the thruster housing and generates electrons that current—and charge—neutralize the ion beam.

In normal operation, the ion-optics assembly serves two main purposes, consisting of ion acceleration (as mentioned above) and as a means of preventing electrons present within the beam plasma from being accelerated into the discharge chamber. The ion optics assembly is the key element of an ion thruster that enables separation of the ion generation, acceleration, and neutralization processes. The key element of the ion optics assembly that causes the separation of these processes is the negatively biased accelerator grid. In general, the magnitude of the accelerator grid potential directly determines whether electrons from the beam plasma will backstream into the discharge chamber. It is very common in the ground-based testing of ion engines to measure the minimum |accel voltage| where an accel grid can no longer retard electrons present in the beam plasma from backstreaming through the ion optics assembly and into the discharge chamber of an ion thruster. The onset of backstreaming is detected by decreasing the voltage of the accel supply (from an initial voltage of ~|−500| V) and monitoring the ion beam current. A large increase in the beam current occurs when the accel voltage is decreased below a value commonly termed the "backstreaming limit." The backstreaming limit is generally determined by the accel grid geometry. The region of the accel voltage/beam current curve near the backstreaming limit is non-linear. This is because the operational principle of the ion thruster (i.e., the separation of ion production, acceleration and neutralization processes) breaks down as energetic backstreaming electrons begin to interact within the ion optics assembly and discharge chamber.

To prevent backstreaming, typical ion engines use a fixed accel voltage that has a sufficient magnitude to ensure some margin of safety. Unfortunately, as the accel grid erodes over a period of time which causes its geometry to change, the backstreaming limit changes (i.e., increases). Therefore, the optimal accel voltage to prevent backstreaming also changes over the lifetime of the ion engine. Using a large magnitude fixed accel voltage causes the accel grid to wear out faster near the beginning and middle of a mission and fail sooner than would be desirable. Once the backstreaming limit is reached, a typical ion engine would suddenly (over ~10 to 100 hr) stop producing thrust efficiently. To circumvent this problem, current ion propulsion systems could increase their lifetimes by selecting an even higher accel voltage, but this would cause more accel erosion and pose a larger contamination threat to the spacecraft.

The disadvantages associated with the conventional fixed accel voltage selection techniques for an ion engine have made it apparent that a new technique for accel voltage selection is needed. The new technique should increase the useful life of the ion engine and should not pose a larger contamination threat to the spacecraft. Also, it would be desirable if the new technique could estimate the remaining lifetime of the ion thruster. The present invention is directed to these ends.

SUMMARY OF THE INVENTION

It is, therefore, an object of the invention to provide an improved and reliable automatic accel voltage tracking system for an ion thruster that would increase the useful life of an ion engine and provide a measure of remaining lifetime. An additional object of the present invention is to minimize contamination to the spacecraft.

In accordance with the objects of this invention, an automatic accel voltage tracking system for an ion thruster is provided. In one embodiment of the invention, a voltage tracking system for an ion thruster includes a discharge chamber, a screen grid, an accelerator grid, and an accelerator grid voltage controller. The discharge chamber contains plasma at a given potential. The screen grid is adjacent to the discharge chamber plasma and is voltage biased relative to the plasma to form a plasma sheath that repels electrons and attracts ions from the discharge chamber plasma. The accelerator grid is adjacent to the screen grid and has a voltage for accelerating the ions to create thrust and for preventing any electrons from backsteaming into the ion thruster. The accelerator grid voltage controller supplies voltage to the accelerator grid. The accelerator grid voltage controller adjusts the accelerator grid voltage to minimize the amount of excess voltage required to prevent electron backsteaming into the ion thruster.

The present invention thus achieves an improved automatic accel voltage tracking system for an ion thruster. The present invention is advantageous in that it is also capable of estimating the remaining lifetime of the ion thruster.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
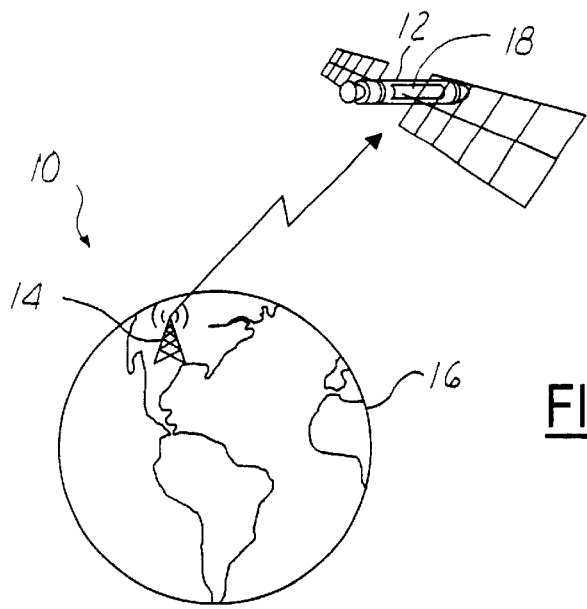
FIG. 1 is a spacecraft system having an automatic accel voltage tracking system for an ion thruster in accordance with one embodiment of the present invention.

In the following figures, the same reference numerals will be used to identify identical components in the various views. The present invention is illustrated with respect to an automatic accel voltage tracking system for an ion thruster, particularly suited for the aerospace field. However, the present invention is applicable to various other uses that may require extended accel life for an ion generator.

Referring to FIG. 1, a perspective view of a spacecraft system 10 having an automatic accel voltage tracking system for an ion thruster in accordance with one embodiment of the present invention is illustrated. The spacecraft system 10 is comprised of one or more spacecraft 12 in communication with a ground station 14 located on the Earth 16. Each spacecraft 12 contains one or more automatic accel voltage tracking systems for an ion thruster 18 for processing power.

Figure 2:
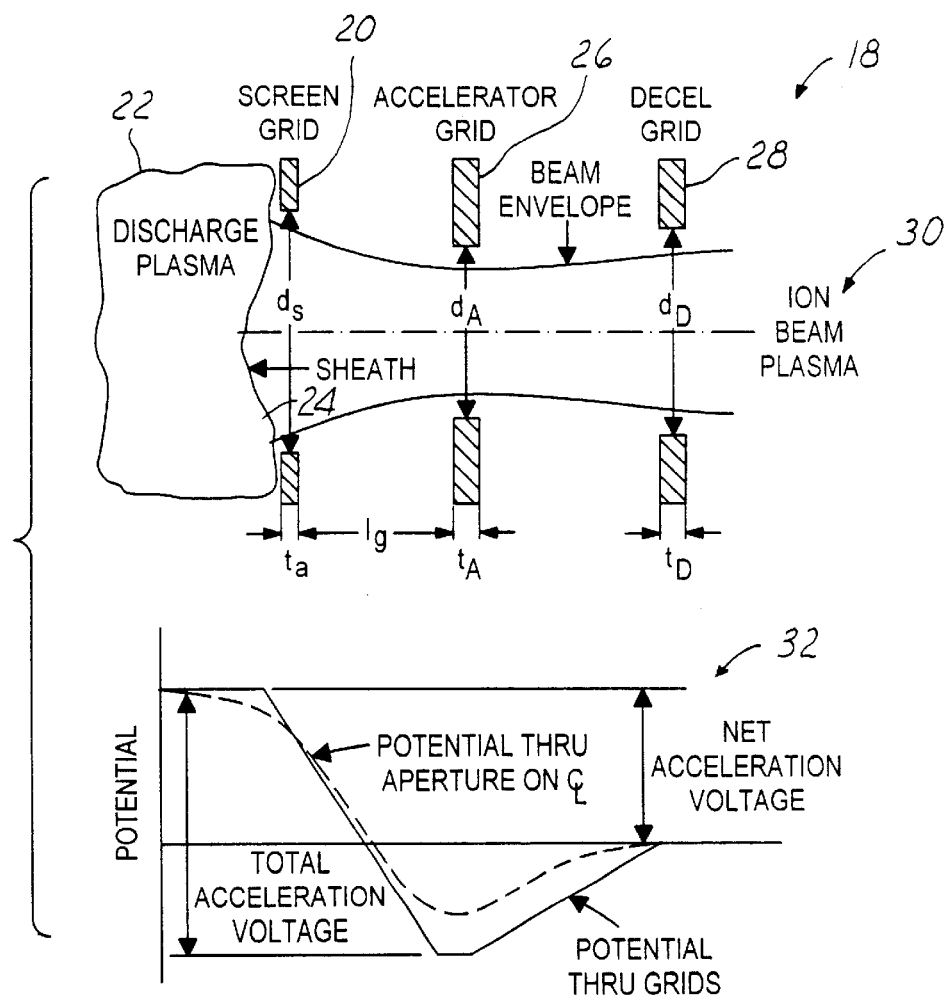
FIG. 2 is a depiction of an automatic accel voltage tracking system for an ion thruster in accordance with one embodiment of the present invention.

Referring to FIG. 2, an automatic accel voltage tracking system 18 for an ion thruster in accordance with one embodiment of the present invention is illustrated. FIG. 2 presents nomenclature and geometry related to a three-grid ion optics aperture set. One skilled in the art, however, would realize that the present invention may be applied to ion thrusters using several to many thousands of apertures. A screen grid 20 is located adjacent to a discharge chamber plasma 22 and includes a plurality of apertures. Screen grid 20 is biased ~30 V negative relative to the discharge chamber plasma 22. As an example, in one implementation, screen grid 20 and discharge chamber plasma 22 are held at 720 and 750 V, respectively, with respect to the spacecraft 12.

Near the screen grid 20, a plasma sheath 24 forms that repels electrons in the discharge chamber plasma 22 and attracts and accelerates ions. The ions accelerate much more after they pass through the screen grid 20 due to large electric fields produced by an accelerator grid 26, typically held at −200 V (with respect to the spacecraft 12). The ions are then decelerated slightly as they pass between the accel grid 26 and a decel grid 28, the furthest grid downstream. The decel grid 28 potential is typically ~20 negative of the beam plasma 30 that forms just downstream of it.

The accelerator grid 26 serves to accelerate the ions from the discharge chamber 22, but it also prevents electrons present in the beam plasma 30 from backstreaming into the thruster. The plot in FIG. 2 shows the potential variation through the grids on the centerline of the aperture set and through the webbing of the grids. The potential within the aperture set near the axial position of the accel grid 26 is higher than the accel potential due to both geometrical and space charge effects, but it is still low enough to prevent electron backstreaming.

As ions pass through the apertures and region immediately downstream of the screen grid 30, a small percentage will charge-exchange with neutral atoms. Each reaction results in a fast neutral and a slow ion, and, due to the potential gradient between where the charge-exchange ion was generated and the accel grid 26, it is possible that the ion will be vectored into the accel grid 26. When the ion strikes the accel grid 26 it can sputter atoms, and, consequently, erode the accel grid 26 over time. The sputter yield is nearly proportional to the energy of the ion for energies between ~100 and 600 eV.

Decreasing the magnitude of the accel voltage can reduce the energy of the ion striking the accel grid 26 and this will slow erosion of the accel grid 26. Most of the ions strike the barrel of the accel hole in three-grid ion optics systems, and subsequent sputter erosion increases its diameter. At the beginning of life (BOL) of an ion thruster system that utilizes a fixed accel voltage, the minimum potential along the axis is much larger than it needs to be to stop electrons from backstreaming. However, as the accel grid hole diameter grows due to charge-exchange ion erosion, it becomes less effective at suppressing the potential within the beamlet. At the end of life (EOL) the accel diameter has grown to the point where it cannot stop backstreaming of electrons. These electrons will be accelerated upstream through the aperture set into the discharge chamber. Some of them will collide with neutrals within the apertures and produce plasma, which will further increase the potential in this region and allow more electron current to flow.

Figure 3:
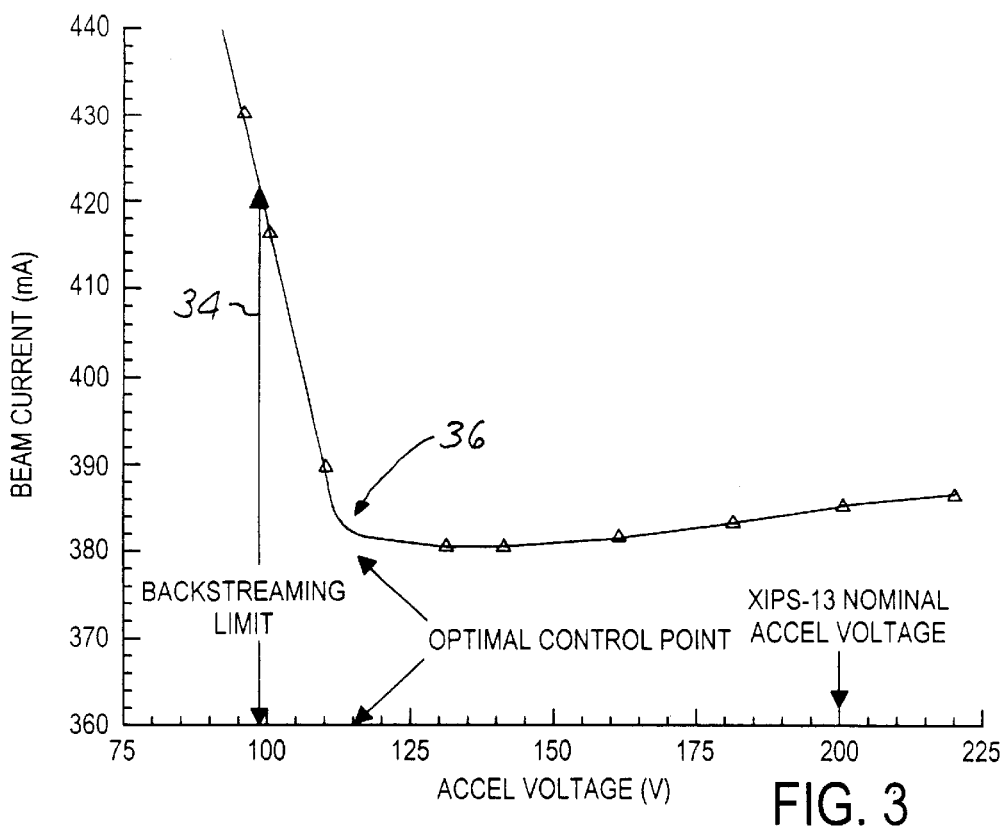
FIG. 3 is a plot of backstreaming data for a typical ion thruster in accordance with one embodiment of the present invention.

Referring to FIG. 3, a plot of backstreaming data for a typical ion thruster in accordance with one embodiment of the present invention is illustrated. The plot in FIG. 3 shows the beam current to increase quickly near ~98 V, approximately 102 V below the nominal accel voltage of ~200 V. The accel voltage where the beam current has increased by ~10% (i.e., ~−98 V) is the backstreaming limit 34. When the magnitude of the accel voltage is continually adjusted to an optimal value 36 (i.e., slightly above the backstreaming limit), the accel grid 26 will wear out much slower.

Figure 4:
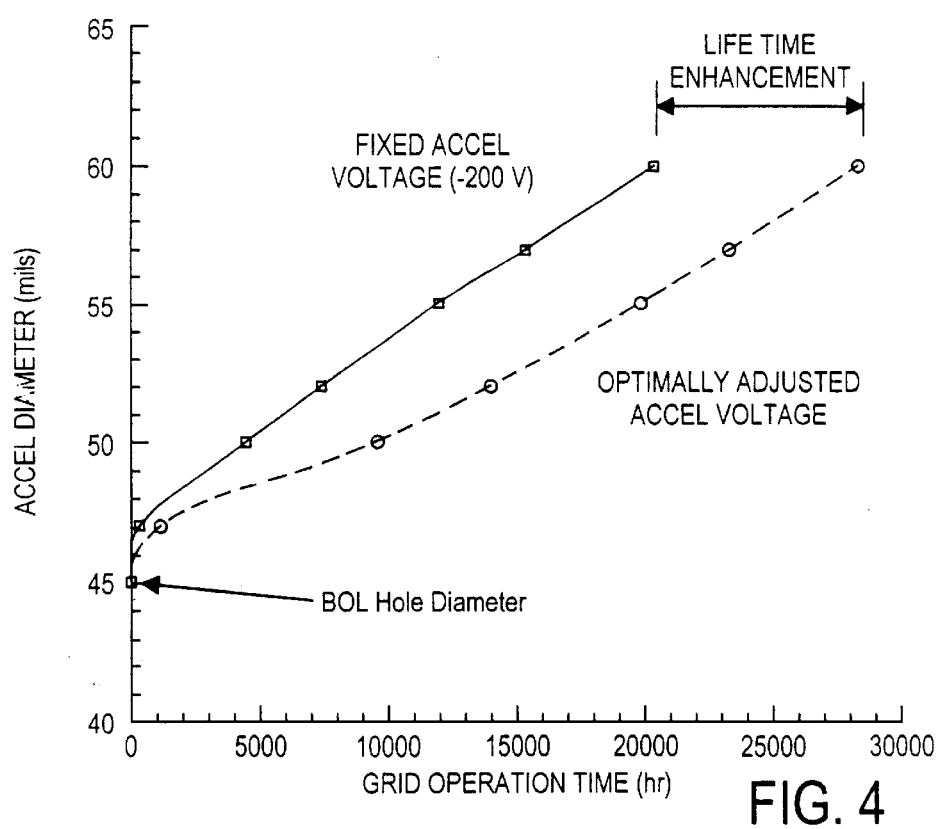
FIG. 4 is a plot of theoretical accel grid diameter versus thruster operational time for systems employing both fixed-output and optimally controlled accel supplies in accordance with one embodiment of the present invention.

Referring to FIG. 4, a theoretical plot of accel grid 26 diameter versus thruster operational time for systems employing both fixed-output and optimally controlled accel supplies in accordance with one embodiment of the present invention is illustrated. In one embodiment of the present invention, the estimated operational time before the accel grid hole diameter grows to 0.0595" is 30,000 hr for the optimally controlled accel voltage system. The end of life assumes an accel voltage of −200 V can no longer stop electron backstreaming. An operational time of 30,000 hours is ~50% greater than the life time predicted for an identical ion thruster utilizing a 200 V, fixed-output accel voltage.

Figure 5:
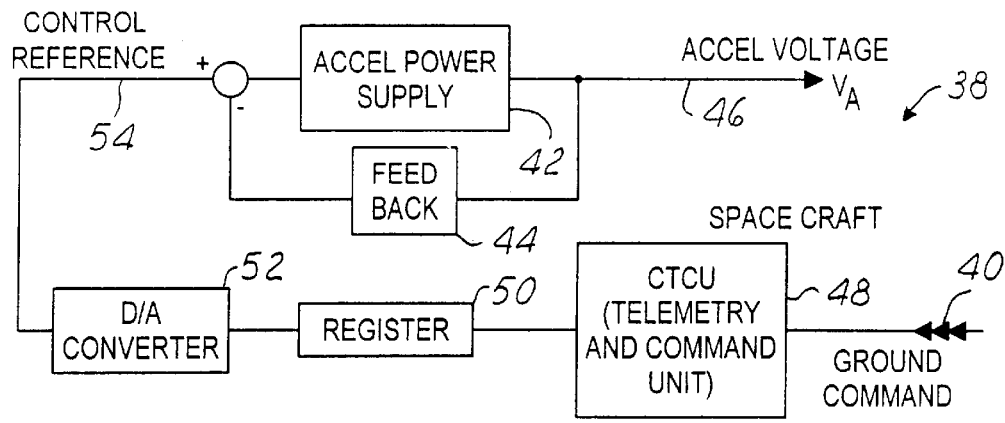
FIG. 5 is a block diagram of an accel voltage tracking system for an ion thruster using ground command in accordance with one embodiment of the present invention.

Referring to FIG. 5, a block diagram of an accel voltage tracking system 38 for an ion thruster using ground command 40 in accordance with one embodiment of the present invention is illustrated. Accel voltage tracking system 38 includes an accel power supply 42 and a feedback loop 44 for supplying an accel voltage 46 to accel grid 26. The accel voltage 46 will be set close to the backstreaming limit near the beginning of life, and, after a predetermined number of hours of operation of the individual thruster, the accel voltage amplitude can be increased to the desired level through a ground command 40. Ground command 40 is received by a telemetry and command unit 48 and is processed by a register 50 and a D/A converter 52 to generate a control reference voltage 54. The desired level of accel voltage will be derived from thruster backstreaming data versus hours of operation. The accel voltage 46 can be adjusted in a reasonably large number of steps to optimize this technique. If it is necessary to measure the actual backstreaming limit, ground commands 40 could be used to gradually step down the accel voltage 46 until the beam current is observed to increase, which is exactly similar to backstreaming measurements made during ground-based testing.

Figure 6:
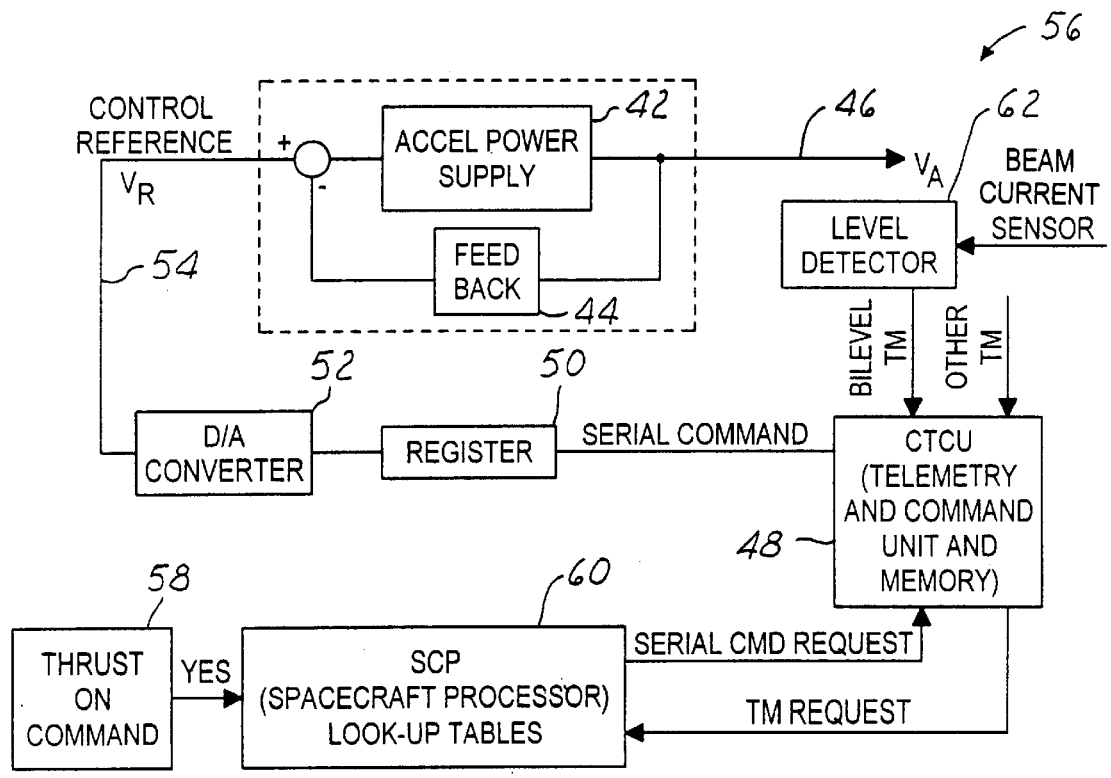
FIG. 6 is a block diagram of an automatic accel voltage tracking system for an ion thruster in accordance with one embodiment of the present invention.

Referring to FIG. 6, a block diagram of an automatic accel voltage tracking system 56 for an ion thruster in accordance with one embodiment of the present invention is illustrated. System 56 is similar to system 38 with modifications such that accel voltage 46 is adjusted automatically in system 56. The accel voltage 46 ($V_A$) is always proportional to the control reference voltage 54 ($V_R$).

Therefore:

$$|V_A| = k\, V_R$$

or $$\pm|\Delta V_A| = \pm k\, \Delta V_R$$

with k=constant

With a "thrust on command" 58 to a particular thruster, a Spacecraft Control Processor (SCP) 60 will set the accel voltage for this thruster at its predetermined value, which is stored in memory. After sensing the "thrust on" state of the thruster and after some specified delay, the SCP 60 will request a serial command from the TCU 48. This serial command, after conversion will create a step of $-\ni V_R$ on the control reference voltage 54 for $\ni$ T milliseconds. This $-\ni V_R$ will generate a $-|\ni V_A|$ step on the accel voltage 46. If there is no backstreaming of electrons into the thruster discharge chamber due to this step change of $\ni V_A$ then there will be no increase in beam current and the thruster will continue to run at the preset accel voltage. This process of periodically down stepping $|V_A|$ is repeated at a time period of "T" minutes during the "thrust on" time of the thruster. If backstreaming of electrons occurs due to the $\ni V_A$ steps, then the beam current $I_B$, will go up during the $\ni$ T time of the step.

The increase in beam current will be detected by a level detector 62 and processed by the SCP 60. The SCP 60 will then adjust the control reference 54 and magnitude of the accel voltage 46 to a predetermined higher level. The thruster will now run at this newly adjusted accel voltage until it needs adjustment again. The last adjusted accel voltage will be stored in the memory when the thruster is turned 'off', and the next time this particular thruster is turned 'on', the system will go to this accel voltage. To confirm the actual backstreaming limit, a ground command 40 could be issued to reset the accel voltage 46 (and the reference voltage 54) to a value below the backstreaming limit and let the automatic control system 56 relocate the minimum value where no backstreaming will occur.

The present invention minimizes the rate at which the accel grid is eroded in an ion thruster. Current state of the art ion propulsion systems utilize fixed accel voltages, which causes the accel grid to wear out faster near the beginning and middle of a mission and fail sooner than a system that automatically adjusts the accel voltage to an optimum value during the mission. In short, this invention increases the operating life of the thruster. In present systems utilizing fixed accel voltages, it is impossible to estimate the remaining life of the thruster during its mission. With this invention, it is possible to estimate the remaining life of the thruster from its operating accel voltage at any stage of the mission. The lower the accel operating voltage, the higher the life expectancy of the thruster.

From the foregoing, it can be seen that there has been brought to the art a new and improved automatic accel voltage tracking system for an ion thruster. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A voltage tracking system for an ion thruster comprising:
   a discharge chamber containing plasma, said plasma having an associated plasma potential;
   a screen grid adjacent to said discharge chamber, said screen grid having at least one screen grid aperture and an associated screen grid voltage, said screen grid voltage biased relative to said plasma voltage, whereby a plasma sheath is formed that repels electrons and attracts ions in said plasma, such that said ions pass through said screen grid aperture;
   an accelerator grid adjacent to said screen grid, said accelerator grid having at least one accelerator grid aperture corresponding to said screen grid aperture, said accelerator grid having a corresponding accelerator grid voltage, whereby said ions are accelerated through said accelerator grid aperture; and
   an accelerator grid voltage controller coupled to said accelerator grid and supplying said accelerator grid voltage, said accelerator grid voltage controller including control logic operative to adjust said accelerator grid voltage, whereby said magnitude of accelerator grid voltage is minimized while preventing backstreaming into said ion thruster.

2. The voltage tracking system for an ion thruster as recited in claim 1, wherein said gas comprises plasma.

3. The voltage tracking system for an ion thruster as recited in claim 2, wherein said plasma comprises Xenon plasma.

4. The voltage tracking system for an ion thruster as recited in claim 1, further comprising a decelerator grid adjacent to said accelerator grid, said decelerator grid having at least one decelerator grid aperture corresponding to said screen grid and accel grid aperture, said decelerator grid having a corresponding decelerator grid voltage, whereby said ions are decelerated through said decelerator grid.

5. The voltage tracking system for an ion thruster as recited in claim 1, wherein said accelerator grid voltage is set close to a backsteaming limit of said ion thruster at the beginning of said ion thruster life.

6. The voltage tracking system for an ion thruster as recited in claim 5, wherein said accelerator grid voltage controller comprises a ground command to increase said magnitude of accelerator grid voltage to prevent said backstreaming.

7. The voltage tracking system for an ion thruster as recited in claim 6, wherein said ground command is based upon a time of operation of said ion thruster.

8. The voltage tracking system for an ion thruster as recited in claim 5, wherein said magnitude of accelerator grid voltage is determined by gradually reducing said magnitude of accelerator grid voltage until said backstreaming occurs, then increasing said magnitude of accelerator grid voltage until said backstreaming stops.

9. The voltage tracking system for an ion thruster as recited in claim 1, further comprising a spacecraft processor coupled to said accelerator grid voltage controller, said spacecraft processor including control logic operative to automatically adjust said accelerator grid voltage by periodically reducing said magnitude of accelerator grid voltage for a period of time while monitoring a beam current and increasing said magnitude of accelerator grid voltage a predetermined level when said beam current begins to increase.

10. A spacecraft system for an ion thruster comprising:
a spacecraft in communication with said ground station, said spacecraft having a voltage tracking system comprising:
  a discharge chamber containing plasma, said plasma having an associated plasma potential;
  a screen grid adjacent to said discharge chamber, said screen grid having at least one screen grid aperture and an associated screen grid voltage, said screen grid voltage biased relative to said plasma voltage, whereby a plasma sheath is formed that repels electrons and attracts ions in said plasma, such that said ions pass through said screen grid aperture;
  an accelerator grid adjacent to said screen grid, said accelerator grid having at least one accelerator grid aperture corresponding to said screen grid aperture, said accelerator grid having a corresponding accelerator grid voltage, whereby said ions are accelerated through said accelerator grid aperture; and
  an accelerator grid voltage controller coupled to said accelerator grid and supplying said accelerator grid voltage, said accelerator grid voltage controller including control logic operative to adjust said accelerator grid voltage, whereby said magnitude of accelerator grid voltage is minimized while preventing backstreaming into said ion thruster.

11. The spacecraft system for an ion thruster as recited claim 10, wherein said plasma comprises gas.

12. The spacecraft tracking system for an ion thruster as recited in claim 11, wherein said plasma comprises Xenon plasma.

13. The spacecraft system for an ion thruster as recited in claim 10, further comprising a decelerator grid adjacent to said accelerator grid, said decelerator grid having at least one decelerator grid aperture corresponding to said screen grid and accelerator grid aperture, said decelerator grid having a corresponding decelerator grid voltage, whereby said ions are decelerated through said decelerator grid aperture.

14. The spacecraft system for an ion thruster as recited in claim 10, wherein said accelerator grid voltage is set close to a backstreaming limit of said ion thruster at the beginning of said ion thruster life.

15. The spacecraft system for an ion thruster as recited in claim 14, wherein said accelerator grid voltage controller comprises a ground command to increase said magnitude of accelerator grid voltage to prevent said backstreaming.

16. The spacecraft system for an ion thruster as recited in claim 15, wherein said ground command is based upon a time of operation of said ion thruster.

17. The spacecraft system for an ion thruster as recited in claim 14, wherein said accelerator grid voltage is determined by gradually reducing said magnitude of accelerator grid voltage until said backstreaming occurs, then increasing said magnitude of accelerator grid voltage until said backstreaming stops.

18. The spacecraft system for an ion thruster as recited in claim 10, further comprising a spacecraft processor coupled to said accelerator grid voltage controller, said spacecraft processor including control logic operative to automatically adjust said accelerator grid voltage by periodically reducing said magnitude of accelerator grid voltage for a period of time while monitoring the beam current and increasing said magnitude of accelerator grid voltage a predetermined level when said beam current begins to increase.

19. A method for voltage tracking for an ion thruster comprising the steps of:
  generating a plasma having a plasma potential;
  forming a plasma sheath that repels electrons and attracts ions in said plasma;
  generating an accelerator grid voltage, whereby said ions are accelerated through an accelerator grid aperture; and
  adjusting said accelerator grid voltage, whereby said magnitude of accelerator voltage is minimized while preventing backstreaming into said ion thruster.

20. The method for voltage tracking for an ion thruster as recited in claim 19, wherein the step of adjusting comprises controlling said accelerator grid voltage using a ground command to increase said magnitude of accelerator grid voltage based upon a time of operation.

21. The method for voltage tracking for an ion thruster as recited in claim 19, wherein the step of adjusting comprising automatically adjusting said acceleration grid voltage by periodically reducing said magnitude of accelerator grid voltage for a period of time while monitoring beam current and increasing said magnitude of accelerator grid voltage a predetermined level when said beam current begins to increase.

22. The method for voltage tracking for an ion thruster as recited in claim 19, further comprising the step of determining the remaining lifetime of said acceleration grid based upon a present backstreaming limit.

* * * * *